2,996,397
PAINT TINTING COLOR BASES
Charles William Secker, Jr., Sharon Hill, Pa., assignor to E. I. du Pont de Nemours and Company, Wilmington, Del., a corporation of Delaware
No Drawing. Filed Oct. 7, 1958, Ser. No. 765,738
14 Claims. (Cl. 106—253)

This invention relates to multi-purpose tinting color bases, i.e. dispersion concentrates of prime pigments and extended prime pigments, useful for coloring both aqueous dispersion or latex coating compositions and non-aqueous paint-type organic coating compositions.

Shading of standard colors of ordinary non-aqueous paint products to custom or decorator colors with ordinary colors-in-oil is well known in the art. The desire for custom colors is ever present in aqueous dispersion paints as well as in the non-aqueous paints. The inadequacy of ordinary colors-in-oil for tinting aqueous dispersion paints is well recognized and where custom colors could not be obtained by intermixing two or more standard colors, special tinting color bases have been offered which are specific to the particular vehicle. In providing matching colors in the respective paint vehicles, the number of special tinting color bases has grown to an astounding proportion in comparison with the relatively few color-in-oil tinting bases required prior to the advent of the popular aqueous dispersion paints.

The frequent changes in decorator color trends causes variation in the demand for particular color bases and it is ordinarily impractical for a paint store to stock a complete line of color bases for each type of paint for custom color mixing. The need for color bases which are universally adequate for tinting both non-aqueous paints and the numerous type of aqueous dispersion paints as well as the convenience and economical advantages of such a class of color bases is recognized.

It is an object of this invention to provide a class of fluid tinting color bases which are characterized as being readily dispersible in and adequately compatible with both aqueous dispersion paints, such as the butadiene/styrene copolymer latex paints, acrylic copolymer aqueous dispersion paints, polyvinylacetate aqueous emulsion paints, alkyd resin aqueous emulsion paints, and cellulose nitrate aqueous emulsion paints, and non-aqueous paints which are ordinarily thinned with organic solvent, such as oil paints, enamels, alkyd resin enamels, oleoresinous varnishes, etc.

Another object is to provide a single class of fluid tinting color bases which permits custom color matching between aqueous dispersion paints and non-aqueous paints in the dry film state.

A further object is to provide a class of fluid tinting dispersed prime paint pigment compositions which are comparable in quality on simple mixing in an aqueous dispersion paint composition with that obtained with mixing colors-in-oil in non-aqueous paint compositions, i.e. there is color homogeneity in the tinted product.

Still other objects will become apparent as the description of the invention proceeds.

These objects are accomplished by dispersing a pigment composition comprising at least one paint pigment in an oleaginous organic vehicle comprising, as the principal ingredients, dehydrated castor oil and soya lecithin, in the presence of a liquid non-ionic surfactant composition having as an essential and predominant component thereof at least one water-dispersible polyether surfactant having a polyethanoxyethanol substituent linked through an ether oxygen atom to a ring carbon atom of a 5 to 6 member organic ring containing at least 4 ring carbon atoms, any atom in the ring other than carbon being a single ether oxygen atom, the organic ring being further characterized in having a hydrophobic alkyl substituent of at least 8 carbon atoms linked thereto.

Typical examples of useful species of the surfactant are: alkyphenoxypolyethanoxy alkanols, the hydrophobic alkyl substituent of the phenoxy group preferably being octyl or nonyl, and the water-dispersible ethers of sorbitan monoesters of a 8 to 18 carbon atom fatty monocarboxylic acid having a plurality of mols of ethylene oxide adducted to the sorbitan molecule. The "Tween" surfactants are representative of commercially available species of the latter class of surfactants. Polyethanoxyethanol substituted sorbitan monooleate, "Tween"-81, is particularly preferred of this sorbitan ether class. Octylphenoxypolyethanoxyethanol having an average of 9 to 12 moles of ethylene oxide adducted to octyl phenol, such as "Triton" X–100, is especially preferred of this useful phenoxy class. These especially preferred species can be used individually or in combination in the color base compositions.

The preferred surfactants have a hydrophilic/lyophilic balance which favors dispersibility in water rather than complete solubility in water. To conform with this characteristic, the average number of ethanoxy units per molecule ordinarily is from 8 to about 16. Surfactants of the defined types which have a higher ethanoxy content up to about 30 units and consequently are water-soluble can be used, but they are preferably used in combination with the water-dispersible species having the preferred lower proportion of ethoxy units.

The surfactant composition preferably is liquid to facilitate easy dispersal thereof in the tinting color base and in the base paint to be tinted. Surfactant species of the defined useful types which are not liquid at room temperature can be used in combination with liquid species providing the resulting surfactant mixture is liquid or fluid.

The content of the above defined useful water-dispersible liquid surfactant composition can be from about 1% to 15%, preferably 3% to 12%, based on the weight of the composition.

The content of pigment composition in the tinting base preferably constitutes a major proportion by weight of the non-volatile components of the color base composition. For color bases of high tinting strength, the pigment composition can be composed of a predominant proportion or entirely of one or a mixture of prime color paint pigments. Such color bases in most instances include a small proportion of paint extender pigment the primary function of which is for color strength adjustment of the color concentrates to match established reference standards. The proportion of extender for this purpose ordinarily is from 0.02 to 0.1 part per part by weight of the prime color pigment. In some instances this small proportion of extender pigment advantageously functions as a dispersion aid.

For color bases of reduced tinting strength which are particularly useful in preparing light tints or colors, the pigment composition can be composed of one or more prime color paint pigments extended with a substantial proportion of fine particle size paint extender pigment, preferably a precipitated calcium carbonate extender pigment, an aluminum silicate clay, or a mixture thereof. Another advantageous function of substantial proportions of the extender is to reduce the proportion of oleaginous vehicle in reference to the total pigment as well as to adjust the color strength. In providing a wide range in color strength of the extended color bases, it is practical for the proportion of extender to be as high as 50 parts extender pigment per part by weight of prime color paint pigment. The pigment composition of the reduced strength color bases ordinarily includes a proportion of paint extender pigment at least equal to 0.5 part of the extender pigment per part by weight of the prime color paint pigments.

Although the prime color pigment can be any one of the wide variety paint pigments ordinarily used in the formulation of drying fatty acid glyceride oil paints, oleoresinous varnishes and enamels, alkyd resin enamels, cellulose nitrate lacquer enamels, utility of the color base as a multi-purpose tinting base for tinting aqueous dispersion polymer and latex paint compositions as well as non-aqueous paints, directs selection of the prime pigment preferably to insoluble, non-reactive pigments which can tolerate the pH range ordinarily found in such aqueous dispersion paint compositions. These aqueous dispersion paint compositions may be either significantly alkaline with a pH as high as about 9 as in the case of casein-containing paints and butadiene/styrene copolymer latex paints or slightly acidic with a pH as low as about 4 as in the case of aqueous polyvinylacetate paints.

Particularly preferred prime color pigments which can be used singly or mixed in varying proportions to provide a satisfactory range of color bases for formulating a gamut of custom colors include red iron oxides, such as Venetian Red and Indian Red, ferrite yellow, raw and burnt umber, raw and burnt siennas, French ochre, chrome yellow, molybdate orange, phthalocyanine blue, phthalocyanine green, lamp black, manganese BON maroon, and titanium dioxide.

Useful extender pigments include precipitated calcium carbonate, china clay, hydrous aluminum silicate, talcs and other finely divided, water-insoluble, chemically inert pigments which contribute substantially no color hiding to the color base. Particularly preferred extender pigments are characterized by an average particle-size diameter about 0.5 micron or less as determined by electron microscope measurements.

The extender preferably should have a content no greater than 0.5% of particles which will be retained by a 325 mesh screen. Representative of preferentially useful extender pigments are "Surfex" precipitated calcium carbonate surface treated with rosin (oil absorption—12) and "ASP-200" hydrous aluminum silicate (oil absorption—38 to 40). The latter is further characterized by a coarseness specification of 99.5% having a particle-size diameter of less than 3.5 microns.

The oleaginous vehicle for the dispersed pigment composition is principally composed of a mixture of dehydrated castor oil and soya lecithin, the latter ordinarily being referred to simply as lecithin inasmuch as soya bean oil is the principal commercial source of lecithin.

The composition of commercial soya lecithin is approximately two-thirds by weight of a complex mixture of phosphatides, phosphatidylcholines and phosphatidylethanolamine and one-third of fatty monocarboxylic acid triesters of glycerol which are found in soya bean oil. The composition of soya lecithin and specifications of commercial grades are described in detail in the Encyclopedia of Chemical Technology, Interscience Publishers, Inc., N.Y., volume 8, pages 309 to 325.

The term soya lecithin as used throughout the specification refers to the commercial grade which includes approximately one-third soya bean oil. More specifically, the term refers to commercial soya lecithin having a content of acetone-insolubles of 60% to 70% by weight identified as lecithin, the balance which is soluble in acetone being the glyceride oil. This quality of material is available commercially under several different trademarks as well as under the name soya lecithin.

Lecithin is also available from other sources, such as from egg yolk and maize germ, as an oil free product. Although lecithin from other sources can be substituted for the lecithin content of the preferred commercial soya lecithin, the substitution is impractical economically.

The dehydrated castor oil consists of a mixture of 9,12-octadecadienoic acid triester of glycerol, 9,11-octadecadienoic acid triester of glycerol, and a minor proportion of undehydrated castor oil, i.e. ricinoleic acid (12-hydroxy-9-octadecenoic acid) triester of glycerol. The dehydrated castor oil preferably is unbodied having a viscosity of about G to J by Gardner-Holdt method at 25° C., and characterized by an iodine number (Wijs) of about 130 to 145. Dehydrated castor oil of this quality is commercially available under the trademarks "Isoline," "Dehydrol," "Synthenol" and "Castung" #403. Although the unbodied dehydrated castor oil is preferred, medium to heavy bodied dehydrated castor oil can be substituted in part or entirely for the unbodied grade. Typical commercial medium body grade dehydrated castor oil is characterized by a viscosity of about U to V (Gardner-Holdt) and an iodine number of 120 to 130. Typical heavy body grade is characterized by a viscosity of $Z_2$ to $Z_3$ (Gardner-Holdt) and an iodine number of 112 to 118.

The practical minimum content of oleaginous vehicle for the color bases of this invention is about 5% by weight of the composition. Lower proportions ordinarily do not provide adequate wetting of the pigment with the oleaginous vehicle. Inasmuch as it is desirable that the tinting color base contains a major proportion of pigment by weight, the proportion of the oleaginous vehicle ordinarily does not exceed 0.9 part of the vehicle per part by weight of the pigment composition. About 40% of oleaginous vehicle based on the weight of the composition is a practical maximum, but this is not a critical limitation.

The proportions of the two essential components of the oleaginous vehicle mixture can vary from 0.05 to about 2 parts, preferably from 0.2 to 1.6 parts, of soya lecithin per part by weight of the dehydrated castor oil.

If desired, the oleaginous vehicle can include auxiliary components in minor proportion to supplement the dehydrated castor oil and the soya lecithin. For example, a small proportion of China-wood-tung oil can be included to enhance the drying characteristics or a long oil length drying oil modified glyceryl phthalate or pentaerythritol phthalate alkyd resin, such as a soya oil alkyd resin, included to enhance the color development when the color base is used to tint alkyd enamels.

The fluid color base can be formulated free of volatile components, i.e. it can consist simply of (A) the pigment composition, (B) the liquid oleaginous vehicle and (C) the liquid or fluid surfactant composition. A volatile liquid substantially water-insoluble organic diluent, preferably a hydrocarbon diluent, usually is included in the color base composition to provide for variations in fluidity of the product. The diluent preferably is composed of one or more hydrocarbon fractions of the type ordinarily used in paint, enamel and lacquer formulation. The solvency of these hydrocarbon diluents as characterized by the aniline point can vary widely providing the diluent is compatible with the composition and does not cause phase separation of the surfactants. When the proportion of hydrocarbon diluent is small, the hydrocarbon ordinarily can be of the aliphatic class as the small content of this hydrocarbon introduced into the tinted paint is not sufficient to significantly disturb the solvent balance. When the proportion of hydrocarbon diluent is large, the hydrocarbon preferably is an aromatic hydrocarbon or a high solvency petroleum hydrocarbon fraction characterized by a significant aromatic content. Practical hydrocarbon fractions useful as the diluent have an initial boiling point of at least 100° C. and a boiling end point preferably no greater than 250° C. Toluol, xylol or any of the commercially available high solvency petroleum fractions conforming to the indicated boiling range and having an aniline point up to about 15° C. can be used as the aromatic hydrocarbon diluent. The aliphatic hydrocarbon diluent can be V.M. and P. naphtha, mineral spirits, odorless mineral spirits, and other fractions meeting the indicated boiling range.

In the examples which follow the diluent in most instances is shown as a mixture of a high solvency petroleum fraction and odorless mineral spirits, these hydrocarbon fractions being characterized as follows:

High solvency petroleum diluent

Distillation range (ASTM–D–86–52):
    Initial boiling point_____ 175° C. min.
    End point_____ 223° C. max.
Aniline point_____ About 4° C.
Specific gravity at 25° C_____ 0.847 to 0.866.

Odorless mineral spirits

Distillation range (ASTM–D–86–52):
    Initial boiling point_____° C__ 170–180
    50% _____° C__ 178–188
    End point_____° C__ 201–210
Aniline point_____° C__ 81–88
Specific gravity at 25° C_____ 0.745 to 0.766

Although the volatile diluent preferably consists entirely of one or more of the described hydrocarbon fractions, the diluent can include a minor proportion of a volatile polar organic solvent, such as alcohols, esters, ketones ordinarily used in coating compositions, without adversely affecting the quality or performance of the product.

Practical tinting color bases for dispensing through a small orifice of a paint measuring device, color matching machine, or from the mouth of a tube package having a prescribed volume of the color base preferably have a minimum non-volatile content of approximately 65% by weight, the volatile diluent content preferably being no greater than about 35%. Ordinarily at least 3% of volatile diluent is included in these practical compositions although the product can be entirely free of volatile diluent when the content of the liquid oleaginous vehicle is high. The total content of liquid oleaginous vehicle, volatile diluent and liquid surfactant must be in excess of that sufficient to satisfy the absorption characteristics of the pigment composition, the amount in excess of this requirement being sufficient to thin the dispersion to a fluid composition which is easily dispensed through a small orifice and easily distributed or mixed in the paint composition to be tinted therewith.

In preparing color base, the pigment composition is mixed with the oleaginous vehicle, the surfactant composition and the diluent, if present, and dispersed therein by any one of the ordinary dispersion techniques used in dispersing or wetting pigment with oil in paint manufacture, e.g. by milling on a 3 or 5 roll mill, ball milling, stone milling, mixing in a W. and P. mixer or by sand grinding as described in U.S. Patent 2,581,414.

Color bases having a plurality of prime color pigments in the respective compositions can be prepared by dispersing the pigment mixture in the dispersion vehicle or by mixing appropriate proportions of preformed color bases each formulated with a single prime color paint pigment. The latter procedure is preferred as it provides for compensating adjustments in composition in matching an established standard color. These prime color bases can be mixed with a color base extender composition in which the pigment composition contains one or more extender pigments, with no prime color pigment, to reduce the strength of the tinting color base to any desired level or to match the strength of an established standard. Uniformity of color and strength is particularly important when the color bases are volumetrically or gravimetrically dispensed from a color matching device keyed to match established reference colors.

The color bases ordinarily are packaged in units of 0.25, 0.5, 1, 2 and 4 fluid ounces, the latter volume being primarily for tinting a gallon quantity of the base paint and the small units for tinting a quart of the base paint. Addition of 4 fluid ounces of the color base to a gallon of base paint or 1 fluid ounce per quart corresponds to the color base constituting about 3% of the tinted paint. At this concentration and up to several times this concentration as used in deep tints, such as for example the proportion of 28 volume parts of base white paint and 4 volume parts of color base, the proportion of non-pigmentary components, i.e. the dehydrated castor oil, soya lecithin, surfactants, and diluent introduced into the tinted paint are adequately dispersible in the aqueous and non-aqueous paint compositions and exhibit no adverse effects on the quality or performance of the liquid paint or the dry paint coating obtained therefrom.

The following examples serve to illustrate preferred embodiments of the invention. All percentages and parts are expressed on a weight basis unless otherwise designated.

|  | Examples | | | | | | |
|---|---|---|---|---|---|---|---|
|  | 1 | 2 | 3 | 4 | 5 | 6 | 7 |
| Dehydrated Castor Oil | 11.0 | 4.7 | 8.6 | 5.2 | 6.1 | 9.0 | 37.0 |
| Soya Lecithin | 2.6 | 3.0 | 9.2 | 8.1 | 6.8 | 3.9 | 4.2 |
| Surfactant A | 9.6 | 7.9 |  |  |  |  |  |
| Surfactant B |  | 1.1 | 7.5 | 5.7 | 4.8 | 10.9 | 6.7 |
| High Solvency Hydrocarbon Diluent | 5.1 | 6.8 |  | 10.7 |  | 9.2 |  |
| Odorless Mineral Spirits | 2.7 | 3.2 | 15.8 | 5.8 | 11.0 | 7.1 |  |
| "Surfex" Calcium Carbonate | 9.6 |  | 15.0 | 2.2 | 3.2 | 5.0 |  |
| "ASP"-200 Aluminum Silicate Clay |  |  |  |  |  | 48.5 |  |
| Molybdate Orange YE-637D | 59.4 |  |  |  |  |  |  |
| Light Chrome Yellow Y-433D |  | 73.3 |  |  |  |  |  |
| Venetian Red Iron Oxide |  |  | 43.9 |  |  |  |  |
| Ferrite Yellow |  |  |  | 62.3 |  |  |  |
| Indian Red Iron Oxide |  |  |  |  | 68.1 |  |  |
| Lamp Black |  |  |  |  |  | 6.4 |  |
| Raw Umber |  |  |  |  |  |  | 52.1 |
|  | 100.0 | 100.0 | 100.0 | 100.0 | 100.0 | 100.0 | 100.0 |
| Weight per gallon in pounds | 17.56 | 20.4 | 13.5 | 15.0 | 17.8 | 12.17 | 12.37 |

|  | Examples | | | | | | | |
|---|---|---|---|---|---|---|---|---|
|  | 8 | 9 | 10 | 11 | 12 | 13 | 14 | 15 |
| Dehydrated Castor Oil | 34.8 | 9.6 | 18.3 | 14.9 | 7.9 | 5.3 | 2.8 | 3.6 |
| Soya Lecithin | 4.1 | 9.6 | 10.7 | 11.5 | 4.9 | 2.9 | 2.8 | 3.6 |
| Surfactant A |  |  |  |  | 6.0 | 8.1 |  | 11.6 |
| Surfactant B | 6.4 | 7.9 | 8.8 | 9.6 | 2.9 | 1.0 | 8.8 |  |
| High Solvency Hydrocarbon Diluent |  | 12.3 | 14.8 | 23.6 | 8.8 | 6.6 | 4.0 | 6.0 |
| Odorless Mineral Spirits |  | 6.6 | 8.0 | 11.1 | 4.3 | 3.2 | 3.5 | 5.2 |
| "Surfex" Calcium Carbonate |  | 30.5 | 22.7 | 4.9 | 5.5 | 0.9 | 78.1 |  |
| "ASP"-200 Aluminum Silicate Clay |  |  |  |  |  |  |  | 70.0 |
| Molybdate Orange YE-637D |  |  |  |  |  | 5.8 |  |  |
| Light Chrome Yellow Y-433D |  |  |  |  | 55.7 | 66.2 |  |  |
| Burnt Sienna | 54.7 |  |  |  |  |  |  |  |
| BON Red Dark RT695D |  | 23.5 |  |  |  |  |  |  |
| Phthalocyanine Blue—"Ramapo" [1] Blue FR Pigment |  |  | 16.7 |  | 4.0 |  |  |  |
| Phthalocyanine Green—"Monastral" [1] Green GT-674D Pigment |  |  |  | 24.4 |  |  |  |  |
|  | 100.0 | 100.0 | 100.0 | 100.0 | 100.0 | 100.0 | 100.0 | 100.0 |
| Weight per gallon in pounds | 12.76 | 10.87 | 9.73 | 9.01 | 16.15 | 20.07 | 15.72 | 13.75 |

[1] Du Pont registered trademarks.

In the above examples, the dehydrated castor oil is the unbodied grade having a viscosity of G to H. Surfactant A is "Tween" 81 surfactant, the composition of which corresponds to one mol of sorbitan monooleate etherified with a plurality of moles of ethylene oxide to an HLB value of about 11. Surfactant B is "Triton" X-100 surfactant, the composition of which corresponds to octylphenoxypolyethanoxyethanol having an average of 9 to 10 ethanoxy units per molecule.

In preparing the above color base products, except the products of Examples 9, 10 and 11, the pigment composition was dispersed in the vehicle on a three roll mill in 1 to 2 passes, one pass ordinarily being sufficient to provide the desired fineness of 1 mil or less. In dispersing these compositions, it was advantageous to premix the ingredients and allow the respective mixtures of wetted pigments to stand overnight or longer prior to milling on the rolls. Raw and burnt siennas and umbers on one pass provided a satisfactory fineness of about 2 mils. The BON red pigment, phthalocyanine blue and phthalocyanine green pigments, which are organic colors, were dispersed by sand grinding following the method described in U.S. Patent 2,581,414. Alternatively these organic pigments can also preferably be dispersed by ball milling with steel balls.

Example 16

| Dehydrated castor oil | parts by wt | 13.0 |
|---|---|---|
| Soya lecithin | do | 1.0 |
| Surfactant B | do | 5.0 |
| High solvency hydrocarbon diluent | do | 1.1 |
| Odorless mineral spirits | do | 5.2 |
| Chrome yellow pigment | do | 74.2 |
| Inhibitor solution—11.5% U.S.P. Thymol in mineral spirits | parts by wt | 0.5 |
|  |  | 100.0 |
| Weight per gallon | pounds | 20.25 |

The above composition was prepared as a color base by mixing the components to wet the pigment and subjecting the wetted pigment to 2 passes on a 5 roll mill.

Equivalent color bases were obtained when Surfactant A was either substituted for the entire amount of Surfactant B or used in combination with Surfactant B. These color bases containing Surfactant A as the entire amount of the surfactant or as the major proportion of the surfactant exhibited the advantage of slightly better initial color development in the tinted paints as compared with the product containing Surfactant B as the principal surfactant component.

This same advantage of improved initial color development attributed to the presence of Surfactant A was also observed with molybdate orange as the dispersed pigment. On the other hand, color bases having iron oxide pigments dispersed in the presence of the defined useful alkylphenoxypolyethanoxyethanols, such as Surfactant B, either as the predominant component of the surfactant composition or as the entire surfactant, exhibited slightly improved initial color development in the tinted paints in comparison with the color bases having the iron oxide pigments dispersed in the presence of Surfactant A and like useful polyethanoxyethanol-substituted sorbitan monoesters.

The following examples represent concentrated tinting color bases and reduced strength color bases obtained by intermixing two or more of the respective single pigment color bases described above.

Example 17

VIOLET

| Product of Example 9 | percent by wt | 37.6 |
|---|---|---|
| Product of Example 10 | do | 62.4 |
|  |  | 100.0 |
| Weight per gallon | pounds | 10.14 |

Example 18

REDUCED STRENGTH VIOLET

| Product of Example 9 | percent by wt | 2.6 |
|---|---|---|
| Product of Example 10 | do | 4.3 |
| Product of Example 14 | do | 93.1 |
|  |  | 100.0 |
| Weight per gallon | pounds | 15.13 |

Example 19

GRAY BLUE

| Product of Example 9 | percent by wt | 9.3 |
|---|---|---|
| Product of Example 10 | do | 57.2 |
| Product of Example 6 | do | 33.5 |
|  |  | 100.0 |
| Weight per gallon | pounds | 9.73 |

Example 20

REDUCED STRENGTH RED YELLOW

| Product of Example 9 | percent by wt | 1.2 |
|---|---|---|
| Product of Example 2 | do | 12.7 |
| Product of Example 15 | do | 86.1 |
|  |  | 100.0 |
| Weight per gallon | pounds | 16.0 |

The color bases of this invention as represented by the above described examples were readily dispersed in ordinary commercially available oil paints, alkyd resin enamels, oleoresinous enamels, cellulose nitrate enamels, butadiene/styrene copolymer latex paints, acrylic resin copolymer aqueous dispersion paints and polyvinylacetate emulsion paints by simple stirring until the liquid color base was uniformly distributed throughout the tinted product. The paint coatings dried from the respective compositions were free from pigment agglomeration, color streaking and any evidence of incompatibility of the non-pigmentary components. Aqueous dispersion paints and non-aqueous paints formulated with the same composition and proportion of white pigment in the respective base paints developed uniformly close matching tinted colors when mixed with the same volumes of tinting color bases. Paints differing in the proportion and composition of white pigment composition were respectively closely color matched in the tinted state by appropriate variation in the proportion of the tinting color base. Thus reference colors established in the non-aqueous paint lines were closely matched in the aqueous dispersion paint lines.

The color bases added to gloss paint compositions showed no significant alteration in gloss. Color bases added to flat paint compositions showed no significant effect on sheen with light tints. A slight glossing effect was observed with deep tints using color bases having a high content of the oleaginous vehicle. Sheen alteration can be minimized by using extended color bases in which the vehicle content is relatively lower.

Ordinary proportions of the color bases added to the respective white base paints did not significantly alter the drying rate or the sag resistance. High proportions of color base added to alkyd resin enamel base produced a slight retarding of the drying in comparison with the untinted base.

Presence of the indicated preferred surfactants in the tinted paints did not detectably alter the adhesion of the respective tinted paints to the ordinary substrates. Furthermore, the tinted paints were as scrubbable as the untinted base paints when scrubbed with an aqueous 5% solution of tri-sodium phosphate and when washed with soap or cleaned with scouring powder to remove stains such as ink, #2 soft lead pencil and China Marking Red 169–T crayon.

The color bases stored in sealed containers in a 120° F. oven remained stable for at least two months without settling or pigment separation. Shelf storage at room temperature of about 77° F. showed excellent stability for at least six months. There was no indication of impairment of the ability of the color bases to develop the desired color as a result of shelf or oven storage.

While the above disclosures represent only a few embodiments of the products of this invention, it is apparent that many widely different embodiments thereof can be made without departing from the spirit and scope of the invention and, therefore is intended not to be limited except as indicated in the appended claims.

I claim:

1. A fluid multi-purpose paint tinting color base consisting essentially of (A) a dispersed pigment composition, as the principal component by weight, consisting essentially of at least one paint pigment, (B) about 5–40% of an oleaginous non-volatile organic vehicle for said pigment composition consisting essentially of dehydrated castor oil and soya lecithin in the proportion of 0.05 part to 2 parts of lecithin per part by weight of the dehydrated castor oil, and (C) about 1–15% of a liquid non-ionic surfactant composition consisting essentially of at least one water-dispersible polyether surfactant having a polyethanoxyethanol substituent linked through an ether oxygen atom to a ring carbon atom of a 5 to 6 member organic ring containing at least 4 ring carbon atoms, any atom in the ring other than carbon being a single ether oxygen atom, said organic ring being further characterized in having a hydrophobic alkyl substituent of at least 8 carbon atoms linked thereto.

2. The product of claim 1 wherein said surfactant composition (C) consists essentially of at least one liquid alkylphenoxypolyethanoxyethanol whereof the alkyl substituent is hydrophobic and contains from 8 to 9 carbon atoms and the average composition of the polyethanoxyethanol substituent corresponds to an average of about 8 to 16 ethanoxy units per molecule of the surfactant.

3. The product of claim 2 wherein said surfactant is octylphenoxypolyethanoxyethanol whereof the average composition of the polyethanoxyethanol substituent corresponds to an average of 9 to 12 ethanoxy units per molecule of said surfactant.

4. The product of claim 1 wherein said polyether surfactant composition consists essentially of at least one liquid water-dispersible ether of a sorbitan monoester of an 8 to 18 carbon atom fatty monocarboxylic acid having a plurality of ethanoxy units linked to the sorbitan molecule.

5. The product of claim 4 wherein said polyether surfactant is a polyethanoxyethanol-substituted sorbitan monooleate.

6. The product of claim 1 wherein said surfactant composition consists essentially of a mixture of octylphenoxypolyethanoxyethanol having an average of 9 to 12 ethanoxy units per molecule of said surfactant and a water-dispersible polyethanoxyethanol-substituted sorbitan monooleate.

7. The product of claim 1 wherein said pigment composition (A) includes at least one prime color pigment.

8. The product of claim 1 wherein said pigment composition (A) consists essentially of at least one prime color paint pigment and at least one fine particle-size paint extender pigment in an amount up to about 50 parts of extender pigment per part by weight of prime color paint pigment.

9. The product of claim 8 wherein said extender pigment is characterized by an average particle-size diameter no greater than 0.5 micron and is at least one selected from the group consisting of precipitated calcium carbonate and aluminum silicate clay.

10. The product of claim 1 wherein said vehicle (B) is present in an amount up to about 0.9 part per part by weight of said pigment composition (A).

11. The product of claim 1 wherein said vehicle (B) consists essentially of about 0.2 to 1.6 parts of lecithin per part by weight of dehydrated castor oil.

12. The product of claim 1 which further includes up to 35% by weight of (D) a volatile liquid organic diluent consisting essentially of a hydrocarbon, said diluent being additionally characterized as compatible with said components (B) and (C) and at least substantially water-insoluble, the sum of the respective percentages of (A), (B) and (C) being at least 65% based on the weight of the composition.

13. A fluid tinting color base concentrate composition consisting essentially of (A) a pigment composition consisting essentially of at least one prime color paint pigment, (B) an oleaginous non-volatile organic vehicle for said pigment composition consisting essentially of dehydrated castor oil and soya lecithin in the proportions of 0.2 to 1.6 parts of soya lecithin per part by weight of the dehydrated castor oil, from 3% to 12% of (C) a liquid non-ionic surfactant composition consisting essentially of at least one water-dispersible polyether surfactant having a polyethanoxyethanol substituent linked through an ether oxygen to a 5 to 6 member organic ring containing at least 4 ring carbon atoms, any atom in the ring other than carbon being a single ether oxygen atom, said organic ring being further characterized in having a hydrophobic alkyl substituent of at least 8 carbon atoms linked thereto, and up to 35% of (D) a volatile liquid organic diluent consisting essentially of a hydrocarbon, said diluent being further characterized as compatible with said components (B) and (C) and at least substantially water-insoluble, the sum of the respective percentages of (A), (B) and (C) being at least 65% and the proportion of (B) being from 5% up to 0.9 part per part by weight of (A), the indicated percentages being based on the weight of the composition.

14. A fluid reduced-strength tinting color base composition consisting essentially of (A) a pigment composition consisting essentially of at least one prime color paint pigment and at least one fine particle-size paint extender pigment in an amount from about 0.5 part up to 50 parts per part by weight of said prime color pigment, (B) an oleaginous non-volatile organic vehicle for (A) consisting essentially of dehydrated castor oil and soya lecithin in the proportions of 0.2 to 1.6 parts of soya lecithin per part by weight of the dehydrated castor oil, from 3% to 12% of (C) a liquid non-ionic surfactant composition consisting essentially of at least one water-dispersible polyether surfactant having a polyethanoxyethanol substituent linked through an ether oxygen to a 5 to 6 member organic ring containing at least 4 ring carbon atoms, any atom in the ring other than carbon being a single ether oxygen atom, said organic ring being further characterized in having a hydrophobic alkyl substituent of at least 8 carbon atoms linked thereto, and from about 3% up to 35% of (D) a volatile liquid organic diluent consisting essentially of a hydrocarbon, said diluent being further characterized as compatible with said components (B) and (C) and at least substantially water-insoluble, the sum of the respective percentages of (A), (B) and (C) being at least 65%, and the proportion of (B) being from 5% up to 0.9 part per part by weight of (A), the indicated percentages being based on the weight of the composition.

References Cited in the file of this patent

UNITED STATES PATENTS

| | | |
|---|---|---|
| 2,401,666 | Schmidt | June 4, 1946 |
| 2,572,252 | Erasmus et al. | Oct. 23, 1951 |
| 2,877,130 | Caron et al. | Mar. 10, 1959 |
| 2,878,135 | Willis | Mar. 17, 1959 |